United States Patent Office 2,862,974
Patented Dec. 2, 1958

2,862,974

NEW AROMATIC COMPOUNDS CONTAINING TETRAFLUORETHYL SIDE CHAINS AND A PROCESS FOR PREPARING THEM

Adolf Sieglitz, Bad Soden (Taunus), Herbert Bestian, Frankfurt am Main Hochst, and Karl Rehn, Hofheim (Taunus), Germany, assignors to Farbwerke Hoechst Aktiengesellschaft vormals Meister Lucius & Brüning, Frankfurt am Main, Germany, a corporation of Germany No Drawing. Application September 7, 1955
Serial No. 533,006

Claims priority, application Germany September 11, 1954

11 Claims. (Cl. 260—612)

The present invention relates to new aromatic compounds containing tetrafluorethyl side chains and to a process of preparing them.

Aromatic compounds with side chains substituted by halogen have gained considerable importance as intermediates for the production of dyestuffs, plastics and insecticides.

By the presence of halogenated side chains attached to the aromatic nuclei excellent properties of fastness are imparted to numerous dyestuffs. The fastness improving effect of trifluoromethyl groups is most commonly known. Aromatic compounds carrying fluorinated ethyl groups as side chains have also become known to be valuable intermediates for dyestuffs; these latter compounds are, however, either perfluorinated in the ethyl group or contain in this group chlorine atoms in addition to fluorine atoms. Contrary thereto, compounds with partially fluorinated ethyl groups attached to the aromatic system have not yet been described in literature.

The synthesis of aromatic compounds with partially fluorinated ethyl groups has not been known hitherto. Especially all attempts made to add fluorinated olefins to aromatic compounds under the conditions of the Friedel-Crafts reaction using the conventional catalysts have failed.

Now we have found that tetrafluorethylene can be added to aromatic compounds by reacting such compounds in the presence of cobalt carbonyl compounds. By such reaction aromatic compounds with side chains containing fluorine are formed. The reaction of a mononuclear aromatic compound with one molecule of tetrafluorethylene proceeds for example according to the following scheme:

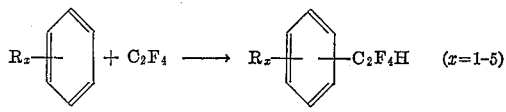

wherein R represents hydrogen, an alkyl, aryl, ether or thioether radical, a carboxylic group which, if desired, may be esterified or amidated, an amino-group the hydrogen atoms of which may be substituted, halogen atoms, such as fluorine, chlorine or bromine, the hydroxyl or sulfhydryl-group, the sulfonic acid group which, if desired, may be esterified or amidated, or the phosphonic acid group or the like. In the case of naphthalene, the two radicals (R), each of which represents the radical —CH=CH—, and which are linked to one another, are attached to 2 adjacent carbon atoms. The esterified and amidated carboxylic or sulfonic groups as well as the amines may carry as esters or amide components aliphatic, including cycloaliphatic, hydrocarbon radicals, such as the methyl, ethyl, propyl, isopropyl, butyl, stearyl or cyclohexyl groups, or aromatic hydrocarbon radicals, such as phenyl, benzyl, tolyl, naphthyl or xylyl radicals or like radicals. The remaining positions which are not substituted either by R or the $C_2F_4H$-group, are occupied in these formulae by hydrogen atoms. It is necessary that one hydrogen atom be present in the nucleus of the starting compound for every molecule of tetrafluorethylene to be added.

Whereas tetrafluorethylene alone and also in the presence of acid catalysts as they are usually applied for adding olefins to aromatic hydrocarbons does not react at all or reacts only in traces in an indefinite manner with aromatic compounds at a temperature of below 200° C., it can be added without difficulty in the presence of cobalt carbonyl compounds. By such reaction a tetrafluorethyl derivative of the aromatic compound used is formed in addition to minor quantities of compounds which are formed by the addition of further molecules of tetrafluorethylene.

As cobalt carbonyl compounds there can be used with special advantage cobalt tetracarbonyl and, preferably, cobalt carbonyl hydrogen, for example in the form of a stable solution $(Co(CO)_4)_2$ or $(Co(CO)_3)_4$ in the aromatic compound to be reacted. It is, however, also possible to use any other cobalt compound and carbon monoxides, or, preferably, mixtures of carbon monoxide and hydrogen, and to produce the cobalt carbonyl compounds, for example dimeric cobalt tetracarbonyl or cobalt carbonyl hydrogen, only during the reaction. Alternatively, it is possible to use cobalt metal, for example in the form of laminas, together with water gas.

In order to avoid decomposition of the thermally unstable cobalt carbonyl compounds, it is advisable to maintain in the reaction system a partial pressure of carbon monoxide of at least about 20 atmospheres, advantageously of at least 50 atmospheres.

The reaction according to this invention can be conducted at temperatures within the range of about 50° C. to about 300° C., advantageously within the range of about 100° C. to about 200° C., and with application of elevated pressure of about 20 to about 400 atmospheres, preferably of 50 to 350 atmospheres.

In the preparation of the tetrafluorethyl-compounds according to the present invention, it is advisable to use an excess of the aromatic compounds which favorably influences the formation of mono-(tetrafluorethyl)-derivatives. Such dilution, furthermore, impedes a spontaneous decomposition of the tetrafluorethylene in the same way as an admixture of carbon monoxide which, advantageously, is added in the form of the inexpensive water gas, counteracts the decomposition of the cobalt carbonyl. It is to be understood that inert solvents such as paraffin hydrocarbons can also be used.

If, however, di- or poly-(tetrafluorethyl)-compounds are to be prepared, it has proved advantageous to use an increased concentration of tetrafluorethylene. It is, however, also possible to operate in a manner such that mono-tetrafluorethyl compounds are reacted with tetrafluorethylene under the conditions outlined above. A particularly good reaction and a relatively large portion of compounds containing several tetrafluorethyl groups can be attained by diluting tetrafluorethylene, advantageously first admitting water gas and then gradually introducing the aromatic compound, in which for example cobalt tetracarbonyl may have been dissolved, into the reaction chamber by means of a pump or a sewer at the pressures and temperatures required for the reaction. Tetrafluorethylene may also be used in the form of a mixture with carbon monoxide in a relatively high concentration. The formation of these compounds containing several tetrafluorethyl groups is likewise favorably influenced when the concentration of the catalysts is increased.

The same more highly tetrafluorethylated products may also be obtained by causing another tetrafluorethylene to act upon a mixture, which has been formed by reacting tetrafluorethylene with aromatic compounds. As a matter of course there are obtained in this case in the reaction mixture mono-fluorethylated compounds in addition to di- and polyetetrafluorethylated compounds. In this manner compounds containing several tetrafluorethyl groups may also be obtained by one operation from the aromatic starting products and tetrafluorethylene.

The cobalt compounds are used in an amount ranging from 0.1 to 5 percent, calculated as cobalt and upon tetrafluorethylene, preferably in an amount of 0.2 to 2 percent. There may also be used quantities of cobalt other than indicated above. During the working up of the reaction mixture the cobalt may be recovered. The reaction mixtures can be worked up with particular advantage by means of water vapor distillation in the presence of a mineral acid, if desired after heating under reflux until the cobalt carbonyl compounds have completely been destroyed.

Another method suitable for regenerating the cobalt consists in that, after complete reaction, the reaction system is released whereby decomposition of the thermally unstable cobalt carbonyl compounds occurs and cobalt is recovered in a metallic form. Depending on the nature of the decomposition the temperature of the additive reaction may be maintained, raised or reduced; such regeneration process may also be facilitated by the admixture of appropriate inert gases.

The unreacted tetrafluorethylene may be isolated from the waste gases by methods known as such; advantageously, it is recycled. It is likewise advantageous to re-use the carbon monoxide or water gas used.

The aromatic compounds, prepared according to the process of this invention, which carry fluorinated sidechains, are isolated from the reaction mixture in a suitable manner, for example by fractional distillation or fractional crystallisation, if desired by way of the derivatives. In so far as the parent material in excess contains cobalt compounds, it is advantageously recirculated.

As aromatic compounds suitable for use in the reaction of this invention there may be mentioned, for example, benzene, toluene and the homologues thereof, such as ethyl benzene, propyl benzene and mono-alkyl benzenes of high molecular weight, xylenes and dialkyl benzenes of high molecular weight, tri- and poly-alkyl benzenes, cumene, cymene and other branch-chained mono- and polyalkyl benzenes as well as polymethylene benzenes, such as tetrahydronaphthalene, furthermore di- and polyphenyls, and di- and polyphenyl-alkanes. There may also be used compounds with condensed aromatic nuclei, such as naphthalene and the homologues thereof, acenaphthene, anthracene, phenanthrene and more highly condensed systems.

The process of this invention is, however, not restricted to the reaction of hydrocarbons. Suitable reaction components are, for example, derivatives of aromatic hydrocarbons which contain halogen, hydrogen, nitrogen, sulfur, phosphorus and other elements in any desired linkage, the optimum reaction conditions varying with the nature of the starting material used. Such optimum reaction conditions can be determined by simple test.

As compounds of this kind there come into consideration, for example: halogen benzenes and any kind of aromatic compounds substituted by halogen, phenols, aromatic alcohols, aldehydes, ketones, acids, amides and esters, ethers, quinones, nitro- and amino-compounds, azo- and hydrazo-compounds, thiophenols, thiophenol ethers, sulfonic acids and sulfinic acid and the esters thereof, sulfones, sulfoxides, sulfamides, aromatically substituted phosphonic and phosphinic acids and the esters thereof, aromatically substituted arsinic acids and the esters thereof, and arseno benzenes. It is to be understood that only such compounds should be used as starting materials as do not decompose under the reaction conditions applied. If compounds are used as parent material which contain sensitive groups, such as aldehydes or ketones, it is advisable to block such groups if a hydration shall be avoided, and to split off the blocking component after the reaction has been achieved. Such process is also suitable in the reaction of amino-compounds.

The aromatic parent compounds may contain one or more substituents or they may be substituted in any desired combination.

The new substances obtained by the process of this invention correspond to the following formula:

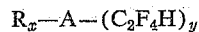

wherein A represents an aromatic ring system, such as the benzene ring, the naphthalene ring system or a trinuclear hydrocarbon system, R has the meaning given above, or represents, for instance, a quinone hydrogen atom or the nitro-group, and wherein $x$ and $y$ each are in an integer of at least 1, the sum of $x+y$ is dependent on the meaning of A, $x+y$ being 6 if A represents the benzene nucleus, being 8 if A is the naphthalene ring system, and being 10 if A is a trinuclear ring system. The compounds defined above may also have the following formula:

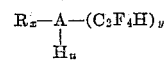

In this formula $x$ and $y$ represent each an integer of 1 to 3 and $u$ is an integer of at least 1, $u$ being determined by the equation $6-(x+y)=u$ if A is the benzene radical, or by the equation $8-(x+y)=u$ if A is the naphthalene ring system and by the equation $10-(x+y)=u$ if A is a trinuclear radical.

More particularly, compounds can be obtained which correspond to the following formula:

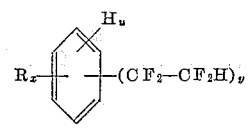

wherein R represents either a hydrogen atom or at least an alkyl radical with at most 3 carbon atoms, $x$ is an integer of at most 3, $y$ is an integer of at most 2 and $u$ is an integer of at least 1, $u$ being determined by the equation $6-(x+y)=u$.

Still other compounds which can be obtained by the process of this invention correspond to the following formula:

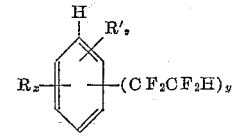

wherein R represents an ether group, a carboxylic group which may be esterified or amidated, the amides or the ester components of which are a hydrocarbon or the amino-group, R' represents a hydrogen atom or alkyl groups with at most 3 carbon atoms, $x$ is an integer of at least 1 to at most 3, $y$ is an integer of either 1 or 2. The sum of $x+y$ is at most 4 and $v$ is an integer of at least 1 and determined by the equation $5-(x+y)=v$.

Still further aromatic compounds containing halogen correspond to the formula:

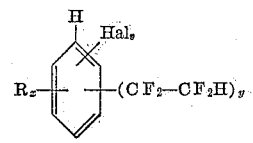

wherein R represents a hydrogen atom or at least an alkyl group with at most 3 carbon atoms each and Hal is a halogen atom, x is an integer of 1 to 3, y is an integer of either 1 or 2, the sum of x+y is at most 4, and v is an integer of at least 1 and being determined by the equation 5—(x+y)=v.

Chemically, the new substances are considerably more stable than, for example, benzyl fluoride. They are distinguished from the corresponding non-tetrafluorethylated aromatic compounds by their higher boiling points and a smaller refractive index. The refractive index is further reduced, if more than one tetrafluorethyl group is introduced into the molecule. Also the differences in the boiling points of similar compounds, for example between tetrafluorethyl aniline and tetrafluorethylnitrobenzene, are mostly analogous to those of non-tetrafluorethylated compounds. The density of such compounds is greater than that of non-tetrafluorethylated hydrocarbons. The new substances, generally, are liquid, if the corresponding non-tetrafluorethylated compound is also liquid. In case the compounds on which the substances are based are solid at room temperature, the tetrafluorinated compounds, in general, are likewise solid. Only when the symmetry of the molecule is considerably changed by the introduction of a $C_2F_4H$-group, as for example with para-dichlorobenzene, the tetrafluorethyl compound is liquid in contradistinction to the starting compound. The new compounds generally also possess the same color as the aromatic compounds on which they are based. The nitro-compounds have a yellowish coloration and tend to crystallize like the known nitro-compounds. The amino compounds constitute light, nearly colorless liquids. Tetrafluorethyl aniline is practically colorless, above all in the freshly distilled condition. Tetrafluorethylated mono-nuclear hydrocarbons are easily mobile liquids and, like the halogenated compounds and the esters, nearly colorless. The capacity of tetrafluorethylated acids to crystallize is analogous to that of the corresponding parent products.

Owing to the great stability of the $C_2F_4H$-groups, in many cases the tetrafluorethylated compounds can be subjected, without modification of their fundamental structure, to the same reactions as the non-tetrafluorethylated compounds. They are remarkably more stable than, for instance, benzyl fluoride and benzal fluoride and are stable against the action of acids and alkalis and can be nitrated like the non-tetrafluorethylated compounds. The nitro-compounds can, furthermore, be reduced in a manner known as such. The amino-compounds can for example be diazotized. The new tetrafluorethylated compounds are, therefore, especially suitable as intermediates for the production of other chemical compounds, for example dyestuffs. They are however, also suitable as additions to lubricants, insulating liquids, such as transformer oils. The tetrafluorethylated nitro-compounds partially constitute interesting odoriferous substances.

The new compounds are very resistant to oxidizing agents. Thus for example alkyl groups attached to the nucleus may be oxidized without changing the tetrafluorethylene group. By oxidation of tetrafluorethyl toluene with potassium permanganate in neutral solution, there are obtained ortho and para-tetrafluorethyl-benzoic acid in the form of white, long and crystalline needles which are sparingly soluble in water.

When conducting a reaction of the kind described above, it is advantageous to protect sensitive groups contained in the molecule or to apply more gentle conditions. If the new compounds carry ester groups, the esters may also be hydrolized by known methods.

The nitration of the aromatic tetrafluorethyl-hydrocarbons may be conducted under very energetic conditions without a modification of the tetrafluorethyl groups occurring; the same applies to the reduction of the said hydrocarbons into the corresponding amino-compounds.

The nitro-compounds correspond to the following formula

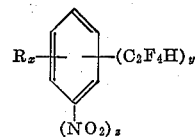

and the amino-compounds have the following formula:

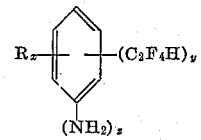

In the first of these two formulae R has the meaning given above except for the nitro-group; in the second formula R has the meaning given above except for the amino- and nitro-groups.

In both formulae x is an integer of at most 4, y and z each are an integer each of at most 2, the sum of x+y is at most 5 and the sum of x+y+z is at most 6. In these compounds, particularly one or more of the radicals (R) may represent hydrogen atoms. Instead of the benzene ring there may also be present the naphthalene ring system or a trinuclear ring system.

The following examples serve to illustrate the invention, but they are not intended to limit it thereto:

*Example 1*

230 grams of tetrafluorethylene are introduced by distillation into a suspension of 15 grams of cobalt carbonate in 200 cc. of benzene in a stirring autoclave made of chrome-nickel steel. Water-gas is added until a pressure of 200 atmospheres is attained and the reaction mixture is heated. At a temperature of 125° C. the pressure increase subsides, and at 130° C. the pressure begins to decrease a little. After heating for two hours to 135° C. the reaction mixture is cooled and 336 grams of a brown yellow liquid are removed from the autoclave. The non-reacted benzene is distilled off through a column, the distillation residue is mixed with 100 cc. of 2 N-sulfuric acid and then distilled with steam. By isolation 147 grams are obtained. This product has a refractive index of $n_D^{20}=1.4036$ and is a mixture of tetrafluorethyl benzene and more highly fluorethylated benzene. From this mixture tetrafluorethyl benzene is isolated by fractional distillation. It is a colorless liquid of a peculiar odor and boils at about 140–141° C. It has a refractive index of $n_D^{20}=1.4223$ and a density of $d_4^{20}=1.27$.

Analysis.—$C_8H_6F_4$ (molecular weight, 178): Calculated for C, 53.94%; H, 3.40%; F, 42.66%. Found: C, 53.66%; H, 3.50%; F, 41.45%.

*Example 2*

60 grams of tetrafluorethylene are introduced by distillation into a solution of 5 grams of dicobaltoctacarbonyl in 200 cc. of benzene in a stirring autoclave made of chrome-nickel steel. Water-gas is added until a pressure of 180 atmospheres is attained and the reaction mixture is then worked up as described in Example 1. By distillation with steam 53 grams of a product are obtained which has a refractive index of $n_D^{20}=1.4247$. It consists mainly of tetrafluorethyl benzene and is worked up to give the pure compound.

*Example 3*

137 grams of tetrafluorethylene are introduced by distillation into a solution of 8 grams of $(Co(CO)_4)_2$ in 600 grams of toluene in a stirring autoclave. Water-gas is added until a pressure of 180 atmospheres is attained and the reaction mixture is slowly heated. At a temperature of 160° C. a decrease in pressure occurs; the reaction mixture is maintained at that temperature for 2 hours. After cooling, 680 grams of a crude product are obtained which are distilled off by steam after the addition of 150 cc. of 2 N-sulfuric acid. The toluene in excess is distilled off from the distillate so obtained and by fractionation under reduced pressure 118 grams of tetrafluorethyl-toluene are obtained in the form of a transparent colorless liquid which boils at 57° C. under a pressure of about 12 mm. of mercury. It has a refractive index of $n_D^{20}=1.4372$ and a density of $d_4^{20}=1.24$.

*Analysis.*—$C_9H_8F_4$ (molecular weight, 192): Calculated for C, 56.25%; H, 4.20%; F, 39.55%. Found: C, 56.23%; H, 4.43%; F, 38.52%.

Example 4

Water-gas is added to a mixture of 176 grams of tetrafluorethylene, 500 grams of naphthalene and 12 grams of dicobalt-octacarbonyl in an autoclave made of chrome-nickel steel until a pressure of 190 atmospheres is attained and the mixture is heated. At a temperature of 120° the pressure, which amounts to 250 atmospheres at that temperature, starts to decrease. After one hour at a temperature of 130–140° C., the reaction is complete, the pressure is released and the liquid reaction mixture is removed from the autoclave at a temperature of 110° C. The cobalt sludge is filtered off by suction; 622 grams of a crude product are formed from which the naphthalene in excess is removed by distillation in vacuo. There is obtained a residue of 280 grams of an oil having a refractive index of 1.5313.

By fractionation of the oil so obtained a mixture which boils at about 119–121° C. under a pressure of about 13 mm. of mercury, has a refractive index of 1.5158–1.5235 and probably consists of alpha- and β-tetrafluor-ethyl-naphthalene is formed.

*Analysis.*—$C_{12}H_8F_4$ (molecular weight, 228): Calculated for C, 63.16%; H, 3.53%; F, 33.31%. Found: C, 63.02%; H, 3.80%; F, 32.92%.

Example 5

400 grams of anisol in which have been dissolved 8 grams of dicobalt-octacarbonyl are mixed in a stirring autoclave made of chrome-nickle steel with 100 grams of tetrafluorethylene; water-gas is then added until a pressure of 190 atmospheres is attained and the reaction mixture is heated to 150° C. Reaction occurs at that temperature with decrease in pressure and is complete after 15 minutes.

440 grams of crude material are obtained from which the anisol is removed by distillation; a crude product is obtained which contains a small amount of phenol which obviously has been formed by minor decomposition of the phenol ether. The product so obtained is then treated of a 2 N-sodium hydroxide solution. 111 grams of a yellow oil are obtained which has a refractive index of 1.4511. By fractionation in vacuo tetrafluorethyl anisol is obtained in the form of a colorless transparent liquid which boils at 83° C. under a pressure of about 13 mm. of mercury and has a refractive index of 1.4478.

*Analysis.*—$C_9H_8OF_4$ (molecular weight, 208.15): Calculated for C, 51.93%; H, 3.87%; F, 36.51%. Found: C, 52.08%; H, 4.26%; F, 35.79%.

Example 6

Water gas is added to a mixture placed in an autoclave and consisting of 400 grams of para-dichloro-benzene, 245 grams of tetrafluorethylene, 100 cc. of heptane and 7 grams of $Co(CO)_4$ until a pressure of 180 atmospheres is attained and the mixture is heated to 150° C. The reaction can be determined by the decrease in pressure and is complete after 15 minutes.

The reaction product so obtained is a crystalline magma which is divided by distillation into different fractions, the tetrafluorethyl-para-dichlorobenzene-fraction distilling over at 140–148° C. under a pressure of about 50 mm. of mercury; refractive index $n_D^{20}=1.4564$.

*Analysis.*—$C_8H_4Cl_2F_4$ (molecular weight, 247.03): Calculated for F, 30.77%. Found: F, 31.50%.

Example 7

40 grams of tetrafluorethylene and water-gas are added to 150 grams of benzoic acid methyl ester in which 6 grams of $Co(CO)_4$ have been dissolved, until a pressure of 160 atmospheres has been attained. The reaction mixture in the autoclave is then heated, while stirring, to a temperature of 150° C. After a constant pressure has formed after the reaction, the mixture is cooled, then removed from the autoclave and subjected to a fractional distillation. The tetrafluorethyl-benzoic acid-methyl ester distills over at 125–135° C. under a pressure of about 15 mm. of mercury as a liquid clear as water and has a refractive index of $n_D^{20}=1.4506$; it is a mixture of isomers but probably contains chiefly the m-compound.

*Analysis.*—$C_{10}H_8O_2F_4$ (molecular weight, 236.16): Calculated for C, 50.85%; H, 3.42%; F, 32.18%. Found: C, 50.85%; H, 3.78%; F, 31.42%.

Example 8

A solution of 3 grams of cobalt carbonyl in 500 cc. of para-xylene is mixed in an autoclave with 69 grams of tetrafluorethylene; water gas is added until a pressure of 180 atmospheres is attained and the reaction mixture is heated. At a temperature of 142° C. and a pressure of 275 atmospheres a decrease of pressure of 10 atmospheres will be observed.

From the reaction product obtained first runnings and xylene are removed by distillation and crude tetrafluorethylpara-xylene (66 grams) is purified by distillation with steam and subsequent fractionation.

2-tetrafluorethyl-xylene-(1.4) obtained constitutes a transparent somewhat moldy smelling liquid which boils at 74° C. under a pressure of about 13 mm. of mercury and has a refractive index of $n_D^{20}=1.4480$.

*Analysis.*—$C_{10}H_{10}F_4$ (molecular weight, 206.18): Calculated for C, 58.25%; H, 4.89%; F, 36.86%. Found: C, 57.80%; H, 5.06%; F, 36.07%.

Example 9

300 grams of tetrafluorethyl benzene (refractive index $n_D^{20}=1.4247$) in which 8 grams of cobalt tertacarbonyl have been dissolved are mixed in an autoclave with 235 grams of tetrafluorethylene; water gas is added until a pressure of 160 atmospheres is attained and the reaction mixture is heated. The reaction, which can be determined by the decrease in pressure, occurs at 136° C. and at a pressure of 238 atmospheres. At 155° C. the pressure is maintained at 270 atmospheres by adding carbon monoxide and the reaction is complete after 4 hours. After the reaction mixture has been cooled and the pressure released, 456 grams of a liquid are obtained having a refractive index of $n_D^{20}=1.3936$, which are subjected to fractional distillation. After first runnings of 19 grams of hydrogenated fluor-hydrocarbons and 25 grams of tetrafluorpropanol which have been formed as by-products by the action of the water gas on tetrafluorethylene, 204 grams of tetrafluorethyl-benzene are recovered. The residue is distilled with steam and from the heavy lower layer of the steam distillate there are obtained, after drying, 130 grams of a mixture consisting of about equal parts of bis- and polytetrafluorethyl-benzene from which the bis-tetra-fluorethyl compound is isolated by fractional distillation.

Example 10

279 grams of tetrafluorethylene and water gas are introduced into a solution of 6.1 grams of cobalt tetracarbonyl $(Co(CO_4))_2$ in 600 grams of benzene in a stirring autoclave made of chrome-nickel steel until a pressure of 180 atmospheres is attained. When heating the reaction mixture, reaction occurs at a temperature of 135° C. and at a pressure of 260 atmospheres, in the course of which the temperature rises up to 187° C. with simultaneous decrease in pressure. At 170° C. a solution of 2 grams of cobalt tetracarbonyl in 350 grams of benzene is pumped into the autoclave within 60 minutes, and the reaction is completed within a further 2 hours at 150° C. After the reaction mixture has been cooled and the pressure released and after distillation of the non-reacted benzene, there are obtained 306 grams of a transparent liquid (refractive index $n_D^{20}=1.4127$) which is subjected to fractional distillation. After the tetrafluorethyl benzene which distills over at 63° C. under a pressure of about 50 mm. of mercury (refractive index $n_D^{20}=1.4247$) there are obtained at 62° C. under a pressure of 13 mm. of mercury 80 grams of a fraction having a refractive index of 1.3926; according to analysis this fraction constitutes a bis-tetrafluorethylbenzene which has been formed by reaction of mono-(tetrafluorethyl)-benzene with tetrafluorethylene and which probably is a meta-derivative.

Analysis.—$C_{10}H_6F_8$: Calculated for C, 43.18%; H, 2.17%; F, 54.65%. Found: C, 43.19%; H, 2.23%; F, 53.95%.

By further distillation of the remaining portions (73 grams) a tris-tetrafluorethyl benzene distills over at 80–83° C. under a pressure of about 11 mm. of mercury which has a refractive index of $n_D^{20}=1.3855$ and has been formed by further reaction; finally there are obtained further tetrafluorethylated products which boil up to 119° C. under a pressure of about 12 mm. of mercury; in the residue remaining behind a crystallisate is finally formed.

Example 11

Water-gas is added to a mixture consisting of 800 grams of toluene, 8 grams of cobalt carbonyl and 266 grams of tetrafluorethylene until a pressure of 180 atmospheres is attained and the reaction mixture is heated to 150° C. Reaction occurs with decrease in pressure and is complete after 30 minutes. After the reaction mixture has been cooled and the pressure released, the toluene in excess is distilled off. The transparent residue (396 grams) is filtered off with suction from metal cobalt and then isolated by fractional distillation. After 196 grams of a mixture of isomeric tetrafluorethyl toluene have distilled over at 56° C.–57° C. under a pressure of 13 mm. of mercury, a second fraction of 67 grams of bis-tetrafluorethyl toluene is obtained which has been formed by reaction of mono-tetrafluorethyl toluene with tetrafluorethylene. The compound is a transparent liquid of a pleasantly aromatic odor and distills over at 82° C. under a pressure of about 12 mm. of mercury. It has a refractive index of $n_D^{20}=1.4090$. The more highly tetrafluorethylated residues partially crystallize in the form of colorless laminae.

Example 12

By reacting naphthalene and tetrafluorethylene according to Example 11 and fractionating the reaction mixture, there is obtained in addition to a mixture of alpha- and β-tetrafluorethylnaphthalene an isomeric mixture which boils at 152° C. under a pressure of about 13 mm. of mercury and has a refractive index of $n_D^{20}=1.4778$. The compound so obtained consists almost completely of naphthalene derivatives which contain two tetrafluorethyl chains attached to the nucleus.

Example 13

(A) 89 grams of tetrafluorethylbenzene (0.5 mol) are dissolved within 12 minutes, while stirring, in 550 grams of nitric acid of 98 percent strength with rapid increase of the temperature to 40° C. which is then kept by external cooling until all the tetrafluorethylbenzene has been added. After the reaction mixture has been allowed to stand for 25 minutes at room temperature, the nitrocompound is obtained in the form of a heavy oil by pouring in 3.5 liters of water. The oil obtained is washed until neutral in the same amount of ether and then dried with calcium chloride. After the ether has been removed by distillation, 102 grams (=92 percent of the theoretical yield) of the nitro compounds are obtained in the form of a yellow oil of a peculiarly aromatic odor.

A test sample is purified by distillation for analysis: the pure compound is a slightly yellowish oil which boils at 110° C. under a pressure of about 12 mm. of mercury and has a refractive index of $n_D^{20}=1.4726$.

Analysis.—$C_8H_5O_2NF_4$: Calculated for C, 43.06%; H, 2.26%; N, 6.28%. Found: C, 43.32%; H, 2.18%; N, 6.17%.

(B) The same compound may also be obtained in the following manner: 178 grams of tetrafluorethyl benzene are added dropwise to a mixture of 125 cc. of concentrated sulfuric acid and 100 cc. of nitric acid of 68 percent strength. While stirring well, the temperature rapidly rises to 60° C. and is kept at that temperature by cooling. The addition of tetrafluorethyl benzene is complete after 15 minutes. The temperature is kept at 60° C. for a further 30 minutes, the transparent clear acid layer is withdrawn and the yellow oil obtained is washed until neutral. After drying with calcium chloride, the distillation yields, without residue, 22 grams of the starting material and 180 grams of nitro-tetrafluorethyl benzene (corresponding to 90 percent of the reacted material).

Example 14

(A) 170 grams of zinc II-chloride dihydrate are dissolved at 50° C. in a mixture of 110 cc. of concentrated hydrochloric acid and 110 cc. of ethanol. 55 grams of tetrafluorethyl-nitrobenzene (obtained according to Example 13) dissolved in 50 cc. of ethanol are then added dropwise to the reaction mixture. Reduction immediately occurs and the mixture starts boiling. After the main reaction has subsided, the mixture is refluxed while heating for a further 1 hour. The cooled reaction solution is then rendered alkaline with a quantity of sodium hydroxide solution sufficient to dissolve the stannates and is then extracted with ether. From the ether extract tetrafluorethyl-aniline is obtained by distillation in the form of a nearly colorless oil which boils at 103° C. under a pressure of about 13 mm. of mercury and has a refractive index of $n_D^{20}=1.4805$. The yield is good.

Analysis.—$C_8H_7NF_4$: Calculated for C, 49.75%; H, 3.65%; N, 7.25%; F, 39.35%. Found: C, 49.69%; H, 3.73%; N, 7.16%; F, 38.89%.

(B) 600 grams of m-nitro-tetrafluorethyl benzene in a stirring flask are reacted in portions with 650 grams of granulated tin and 1620 cc. of concentrated hydrochloric acid so that a brisk but not too vigorous reaction takes place at 95–105° C. The almost clear tea-colored solution is strongly cooled, adjusted to a pH-value of 6.5 by means of sodium hydroxide solution of 20 percent strength and the tin-dioxide hydrate is filtered off with suction. The filter cake practically contains the whole base which is isolated by distillation with steam. By further distillation 435 grams of m-tetrafluorethylaniline are obtained in the form of a slightly yellowish liquid which boils at 102° C. under a pressure of about 12 mm. of mercury and has a refractive index of $n_D^{20}=1.4808$. The yield amounts to 78% of the theoretical.

Example 15

(A) 146 grams of tetrafluorethyl toluene of a fraction boiling at 57° C. under a pressure of 13 mm. of mercury and having a refractive index of $n_D^{20}=1.4380$ are nitrated at 42° C., within 45 minutes, by adding them dropwise to a mixture of 150 grams of nitric acid of 68 percent strength and 300 grams of concentrated sulfuric acid. After the acid layer has been separated, washed and dried, the oil is distilled in vacuo. There are obtained in the form of yellow oils 42 grams of mono-nitroderivative (boiling point: 117–127° C. under a pressure of about 12 mm. of mercury; refractive index: $n_D^{20}$=1.4732–1.4782) and 142 grams of dinitroderivative (boiling point: 155–165° C. under a pressure of about 12 mm. of mercury; refractive index: $n_D^{20}$=1.4938–1.5080).

From the dinitroderivative there are obtained 2 isomers in the form of crystalline, practically colorless and very slightly yellowish compounds.

I. Melting point: 70° C.; boiling point: 159° C. under a pressure of about 12 mm. of mercury, refractive index: $n_D^{20}$=1.4980

II. Melting point: 29.5° C.; boiling point: 165° C. under a pressure of about 12 mm. of mercury; refractive index: $n_D^{20}$=1.5105 the latter compound forming the main quantity. According to their formation compound I probably is 2.6-dinitro-4-tetrafluorethyl-toluene, and compound II probably is 2.4-dinitro-6-tetra-fluorethyl-toluene.

Analysis of the raw dinitrofraction $C_9H_6O_4N_2F_4$: Calculated for C, 38.31%; H, 2.14%; N, 9.93% F, 26.94%. Found: C, 38.24%; H, 2.14%; N, 10.15%; F, 26.48%.

(B) If mono-nitro-tetrafluorethyl-toluene shall be prepared, one can operate in the following manner:

172 grams of tetrafluorethyl-toluene of a fraction which boils at 56° under a pressure of 13 mm. of mercury and has a refractive index of $n_D^{20}$=1.4360, are reacted at 30° C. within 30 minutes with a mixture of 90 grams of nitric acid of 68 percent strength and 180 grams of concentrated sulfuric acid, and the temperature is kept at 30° C. for a further hour. The acid is withdrawn, the oil is washed until neutral, and after drying with calcium chloride distilled in vacuo. After 32 grams of tetrafluorethyl-toluene have been distilled over, mononitrotetrafluorethyl-toluene is distilled over at 125–129° C. and under a pressure of about 17 mm. of mercury; it has a refractive index of 1.4748 to 1.4842. There is obtained 165.5 grams corresponding to a yield of 96 percent.

Analysis.—$C_9H_7O_2NF_4$: Calculated for C, 45.58%; H, 2.98%; N, 5.91%; F, 32.05%. Found: C, 45.56%; H, 2.96%; N, 5.94%; F, 31.23%.

Like the tetrafluorethyl-toluene used as parent material, the mononitro-tetrafluorethyl-toluene obtained probably constitutes an isomer of the product named sub (A).

*Example 16*

45 grams of nitro-tetrafluorethyl-toluene (boiling point: 115° C. under a pressure of 12 mm. of mercury; refractive index: $n_D^{20}$=1.4740) are reduced as described in Example 14 with 45 grams of tin and 105 cc. of concentrated hydrochloric acid. The corresponding tetrafluorethyl-toluidine is a light-colored liquid which boils at 101° C. under a pressure of about 15 mm. of mercury and has a refractive index of $n_D^{20}$=1.4838.

Analysis.—$C_9H_9NF_4$: Calculated for N, 6.76%. Found: N, 6.72%.

*Example 17*

A mixture of 125 cc. of concentrated sulfuric acid and 100 cc. of concentrated nitric acid are added dropwise, at 60° C. within 90 minutes, while well stirring, to 278 grams of m-bis-tetrafluorethyl-benzene (boiling point 60.5° C. under a pressure of 12 mm. of mercury, refractive index: $n_D^{20}$=1.3927) in a flask of 500 cc. capacity. Stirring is continued for further 90 minutes at 90° C., the acid is isolated and the reaction mixture is washed until neutral. By distillation 3.5-bis-tetrafluorethyl-nitrobenzene is obtained in the form of a yellowish oil which boils at 131° C under a pressure of about 12 mm. of mercury and has a refractive index of $n_D^{20}$=1.4326.

Analysis.—$C_{10}H_5O_2NF_8$: Calculated for C, 37.16%; H 1.56%; N, 4.34%. Found: C, 36.91%; H, 1.55%; N, 4.32%.

*Example 18*

144 cc. of concentrated hydrochloric acid are added dropwise within 20 minutes to 65 grams of 3.5-bis-tetrafluorethyl-nitrobenzene and 45 grams of tin, the temperature rises up to 95° C., being regulated by external cooling. After addition of all the hydrochloric acid stirring is continued for a further 30 minutes at that temperature to obtain a completely clear solution, which after cooling with ice is mixed with an excess of potassium hydroxide solution of 50 percent strength to isolate the base. By distillation, 51 grams (yield: 86 percent) of 3.5-bis-tetrafluorethyl-aniline which boils at 116° C. under a pressure of about 12 mm. of mercury and has a refractive index of $n_D^{20}$=1.4338 are obtained.

Analysis. —$C_{10}H_7NF_8$: Calculated for N, 4.78%; F., 51.85%. Found: N, 4.72%; F, 51.18%.

We claim:

1. The process of preparing a fluorinated aromatic compound, which comprises reacting an aromatic compound having at least one hydrogen atom bound to the nucleus with tetrafluorethylene at temperatures between about 50 and about 300° C. and at pressures between about 20 and about 400 atmospheres in the presence of carbon monoxide, hydrogen and a cobalt carbonyl compound consisting of cobalt and a member selected from the group consisting of carbon monoxide alone and carbon monoxide plus hydrogen.

2. The process defined in claim 1, wherein the cobalt carbonyl compound is employed in such an amount that there is about 0.1 to about 5% of cobalt metal present based on the weight of tetrafluorethylene.

3. The process of preparing a fluorinated aromatic compound, which comprises reacting an aromatic compound having at least one hydrogen atom bound to the nucleus with tetrafluorethylene at temperatures between about 100° C. and 200° C. and at pressures between about 50 and about 350 atmospheres in the presence of carbon monoxide, hydrogen and a cobalt carbonyl compound consisting of cobalt and a member selected from the group consisting of carbon monoxide alone and carbon monoxide plus hydrogen.

4. The process defined in claim 3, wherein the cobalt carbonyl compound is employed in such an amount that there is about 0.1 to about 5% of cobalt metal present based on the weight of tetrafluorethylene.

5. The process defined in claim 1, wherein the aromatic compound to be reacted is a hydrocarbon having at least one hydrogen atom bound to the nucleus and is selected from the group consisting of benzene, naphthalene, alkyl substituted benzenes and alkyl substituted naphthalenes in which the alkyl groups have from 1 to 3 carbon atoms.

6. A process as defined in claim 1, wherein the aromatic compound to be reacted is benzene.

7. A process as defined in claim 1, wherein the aromatic compound to be reacted is toluene.

8. A process as defined in claim 1, wherein the aromatic compound to be reacted is naphthalene.

9. A process as defined in claim 1, wherein the aromatic compound to be reacted is anisol.

10. A process as defined in claim 1, wherein the aromatic compound to be reacted is xylene.

11. A process as defined in claim 1, wherein paraffin hydrocarbons are used as inert solvent.

References Cited in the file of this patent

Beilstein, vol. 5, p. 570 (original).
Beilstein, vol. 5, p. 360 (original).
Beilstein, vol. 5, p. 355 (original).
Beilstein, vol. 5, p. 194 (1st Suppl.).
Prober: JACS, vol. 75, pp. 968—73 (1953).